March 3, 1964 G. W. GORMAN 3,123,365
SEALS
Filed April 8, 1959 3 Sheets-Sheet 1

INVENTOR
Gerald W. Gorman

BY *Hastings Ashley*
ATTORNEY

March 3, 1964  G. W. GORMAN  3,123,365
SEALS

Filed April 8, 1959  3 Sheets-Sheet 2

INVENTOR
Gerald W. Gorman

BY *Hastings Ackley*
ATTORNEY

March 3, 1964  G. W. GORMAN  3,123,365
SEALS
Filed April 8, 1959  3 Sheets-Sheet 3

INVENTOR
Gerald W. Gorman
BY
ATTORNEY

United States Patent Office 3,123,365
Patented Mar. 3, 1964

3,123,365
SEALS
Gerald W. Gorman, Midlothian, Tex.
(Box 4236, Dallas, Tex.)
Filed Apr. 8, 1959, Ser. No. 805,028
5 Claims. (Cl. 277—83)

This invention relates to seals and more particularly to seal assemblies for use with rotary shafts.

An object of this invention is to provide a new and improved seal assembly for sealing between a rotary shaft and the housing through which the shaft extends.

Another object of this invention is to provide a seal assembly for rotary shafts to provide a fluid tight seal between the shaft and the housing through which the shaft extends.

Still another object of the invention is to provide a seal assembly for high speed rotary shafts which reduces the speed of rotation between contacting sealing surfaces.

A further object of the invention is to provide a seal assembly for use between a rotary shaft and the housing in which it is supported wherein a speed reducing means is disposed between a ring which rotates with the shaft and a ring which is stationary with respect to the shaft for reducing the relative speed of rotation between contacting sealing surfaces.

A still further object of the invention is to provide a seal assembly for rotary shaft which comprises an annular member rotatable with the shaft which is provided with means for sealing between the shaft and the annular member, a stationary annular member having seal means for sealing between the housing of the shaft and the stationary annular member and a floating member disposed between the two annular members at opposite ends thereof with contacting surfaces of the two annular members.

Another object of the invention is to provide a seal assembly for rotary shafts wherein resilient means are provided to bias the two annular members toward one another to maintain sealing pressure between the floating member and the annular member.

Still another object is to provide a seal assembly for rotary shafts wherein the resilient means are disposed about the shaft between the annular member which is rotatable with the shaft and a retainer ring rigidly secured to the shaft.

Still another object is to provide a seal assembly for rotary shafts wherein the retainer ring and the annular member which is rotatable with the shaft are provided with cooperating means for allowing longitudinally non-rotating movement of such annular member on the shaft.

A further object of the invention is to provide a seal assembly for a rotary shaft which includes a pair of stationary annular members having sealing means for sealing between the housing of the shaft and the stationary annular members, a pair of annular members rotatable with the shaft which are provided with means for sealing between the shaft and the annular member, floating rings disposed between each adjacent pair of stationary and rotatable annular members for effecting seals at opposite ends thereof with contacting surfaces of such annular members and resilient means biasing the two rotatable annular members in opposite directions toward their adjacent stationary annular members.

A further object of the invention is to provide a seal assembly for rotary shafts wherein the floating ring is comprised of two longitudinally aligned sections separated by a connector ring, the two sections of the floating ring being rotatable relative to the connector ring.

Still another object of the invention is to provide a seal for rotary shafts wherein the floating ring is made of titanium, stainless steel, or other metal alloy having a low coefficient of resistance and the annular members which are contacted by the ends of he floating rings are made of a complementary bearing substance, such as Teflon, reinforced Teflon or Gadke material whereby the friction at contacting surfaces is at a minimum value.

Additional objects and advantages of the invention will be readily apparent from the reading of the following description of a device constructed in accordance with the invention, and reference to the accompanying drawings thereof, wherein.

Figure 1:
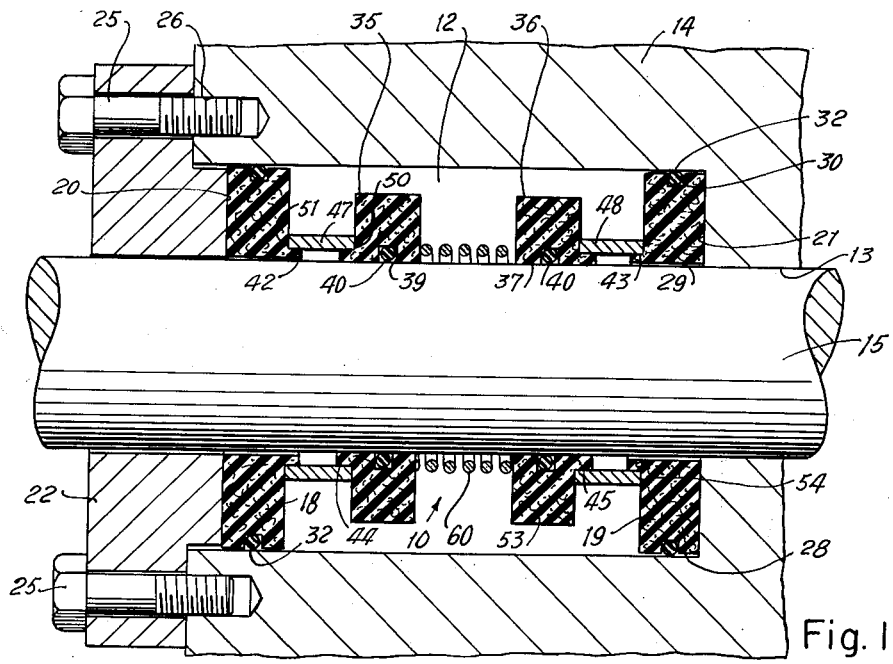
FIGURE 1 is a sectional view of a housing having a shaft bore and a rotatable shaft extending therethrough which is provided with a seal assembly embodying the invention.

Referring now particularly to FIGURE 1 of the drawing, a seal assembly 10 embodying the invention is shown installed in a stuffing box or enlarged portion 12 of the shaft bore 13 of the shaft housing 14 which supports a rotatable shaft 15. The rotatable shaft 15 may be a turbine shaft or a rotary pump shaft which rotates at a very high speed, such as forty or fifty thousand revolutions per minute. The sealing assembly 10 for sealing between the shaft 15 and the housing 14 includes a pair of stationary annular members 19 and 18 which bear against the abutting surfaces 20 and 21 of a retainer plate 22 and the housing 14, respectively. The retainer plate is secured to the end of the housing by means of bolts 25 which extend into threaded bores 26 of the housing 14. The retainer plate 22 closes the open end of the enlarged portion 12 of the shaft bore 13 and has a central boss which extends thereinto to provide the surface 29 against which the stationary annular member 18 is pressed.

The annular stationary members 18 and 19 have outer peripheral surfaces 28 which engage the internal wall surface of the enlarged portion 12 of the shaft bore and with central apertures 29 through which the shaft 15 extends. The central apertures 29 of the stationary annular members 18 and 19 are larger than the diameter of the shaft 15 so that the shaft 15 does not contact or engage the stationary annular members 21. Each of the stationary annular members is provided with an external peripheral annular recess 30 in which O-rings 32 or other sealing means are disposed to effect a fluid tight seal between the stationary members and the housing 14.

The sealing assembly 10 also includes a pair of rotatable annular members 35 and 36 which are disposed on the shaft 15 for rotation therewith. The rotatable annular members 35 and 36 are provided with central openings 37 through which the shaft 15 extends, the external surface of the shaft engaging the internal surfaces of the rotatable annular members 35 and 36. The rotatable annular members 35 and 36 are provided with internal annular recesses 39 in which O-rings 40 or other suitable packing or sealing means are disposed to effect a seal between the annular members 35 and 36 and the shaft 15. The rotatable annular members 35 and 36 are movable both longitudinally and rotatably on the shaft 15 but tend to rotate with and be stationary with respect to the shaft 15 because of the frictional force developed therebetween.

The stationary annular members 18 and 19 are provided with annular end flanges 42 and 43 respectively which extend toward similar annular end flanges 44 and 45 of the rotatable annular members 35 and 36. A floating ring 47 disposed about the rotatable shaft 15 telescopes over the end flanges 42 and 44 of the stationary annular member 18 and the rotatable annular member 35 while a similar floating ring 48 extends about the shaft 15 and about the end flanges 42 and 45 of the stationary annular member 19 and the rotatable annular member 36. The end flanges which telescope into the opposite ends of the floating rings 47 and 48 serve to properly center the floating rings relative to the stationary and rotatable annular members which the floating rings contact. The floating rings 47 and 48 are preferably formed of titanium, stainless steel, or other metal, while the annular members are formed of a complementary composition material such as Gadke composition or Teflon whereby a low friction sealing contact is obtained between the annular end surfaces 50 and 51 of the floating ring 47 at its contact with the abutting surfaces of the rotatable ring 35 and the stationary annular member 18, respectively. Similarly, a low friction sealing contact is obtained at the end flat surfaces 53 and 54 of the floating ring 48 and the abutting surfaces of the rotatable annular member 36 and stationary annular member 19.

A resilient means such as the spring 60 is disposed about the rotatable shaft 15 and between the rotatable annular members 35 and 36 to bias the rotatable annular members 36 away from each other and toward the stationary annular members 18 and 19 respectively whereby a predetermined pressure is exerted at the annular flat end surfaces 50 and 51 of the floating ring 47 and 53 and 54 of the floating ring 48. As a result, fluid which may seek to enter through the bore 13 and the enlarged bore portion 12 thereof is prevented from passing between the shaft 15 and the housing 14 since the O-rings 32 seal between the housing and the stationary annular members and the O-rings 40 seal between the rotatable annular members and the shaft. The contact between the annular members and the end surfaces of the floating rings prevent passage of fluid between such end surfaces and the annular members which they contact, a sufficient force being exerted by the spring 60 to effect the required seal therebetween.

The provision of two pairs of complementary stationary and rotatable rings provide duplicate seals between the rotatable shaft 13 and the housing 14 to doubly ensure the preventing of leakage of fluids between the shaft 15 and the housing 14 through the shaft bore 13.

The rotatable annular members 35 and 36 rotate with the shaft 15 due to their contact with the shaft 15 so that the sealing contact of the O-rings 40 with the shaft 15 effects a stationary type seal. Similarly, the O-rings 32 effect a stationary type seal between the stationary rings 18 and 19 and the housing 14 since the outer peripheral surfaces of the stationary rings engage the large bore 12 of the housing and since the shaft 15 does not contact the stationary annular members. The floating rings 47 and 48 and the annular members are of such complementary materials that very little friction is provided between the annular flat end surfaces of the floating rings and the annular members. All surfaces of the floating rings which contact the annular members are polished to reduce such friction to a minimum.

The floating rings 47 and 48 rotate at a speed slower than the speed of the shaft 15. For example, it has been found that the floating rings 47 and 48 rotate at a speed of some nine or ten thousand revolutions per minute when the shaft is rotated at a speed of forty or fifty thousand revolutions per minute. It will be apparent that if the friction between the floating ring 47 and the rotatable annular member 35 increases, the speed of rotation of the ring 47 will tend to increase. Conversely, if the friction between the floating ring 47 and the stationary annular member 18 increases, the speed of rotation of the floating ring 47 will decrease. As a result, the floating ring 47 will rotate at a speed which is determined by the relative frictional forces developed at opposite ends of the ring 47 between the ring 47 and the annular members 18 and 35. This also holds true of the speed of rotation of the floating ring 48 whose speed of rotation depends upon the relative frictional forces existing at its opposite ends between the annular members 19 and 36.

Since the composition of the annular members is chosen to provide a minimum of friction between the annular members and the floating rings and since the portions of the floating rings 47 and 48 which contact the annular members are polished to a high degree, the floating rings 47 and 48 rotate at a speed which is a fraction of the speed of rotation of the shaft 15. As a result, the contact speed at the end surfaces 50 and 51 and 53 and 54 of the floating rings 47 and 48 is considerably smaller than would result at the point of contact of two sealing members, one of which was stationary with the housing and the other which was stationary with the shaft. This reduced contact speed at the sealing surfaces of the floating rings provides a good fluid type seal even though the speed of rotation of the shaft is very considerable and reduces the wear on the sealing or contacting surfaces of the elements of the seal assembly 10.

It will now be apparent that a seal assembly 10 has been illustrated and described which includes members such as the annular members 18 and 19, which are adapted to be received in a stuffing box or enlarged portion 12, of the bore shaft 13 of the housing and are provided with sealing means such as the O-rings 32 for sealing between the members and the housing to prevent flow of fluids therebetween.

It will further be seen that the seal assembly 10 also includes a pair of annular members 35 and 36 which are telescoped on the rotatable shaft 15 to rotate therewith and are provided with sealing means, such as the O-rings 40, for sealing between the rotatable annular members 35 and 36 and the shaft 15.

It will further be seen that a floating ring 47 is disposed between each cooperating pair of annular members to affect a rotatable contact seal at abutting annular end surfaces thereof.

It will further be seen that the rotatable annular members 35 and 36 tend to rotate with the shaft 15 since the shaft 15 extends therethrough and is frictionally engaged thereby.

It will further be seen that the rotatable annular members 35 and 36 are longitudinally slidable on the shaft toward the stationary annular members and that the resilient spring 60 disposed therebetween biases the rotatable annular members in opposite directions toward their cooperating stationary members whereby the floating rings 47 and 48 are held in fluid tight sealing engagement at their opposite ends with the adjacent pair of movable and stationary annular members.

It will further be seen that the provision of the floating rings 47 and 48 decreases the relative speed of rotation between the end surfaces of the floating rings and the contacting surfaces of the annular members whereby the wear of the annular members and of the floating rings is reduced and whereby a better sealing effect is achieved than if such relative speed of rotation were greater.

It will further be seen that the floating rings 47 and 48 are held in properly centered position by the end flanges 42 and 44 and 43 and 45 of the stationary and annular members respectively.

Figure 2:
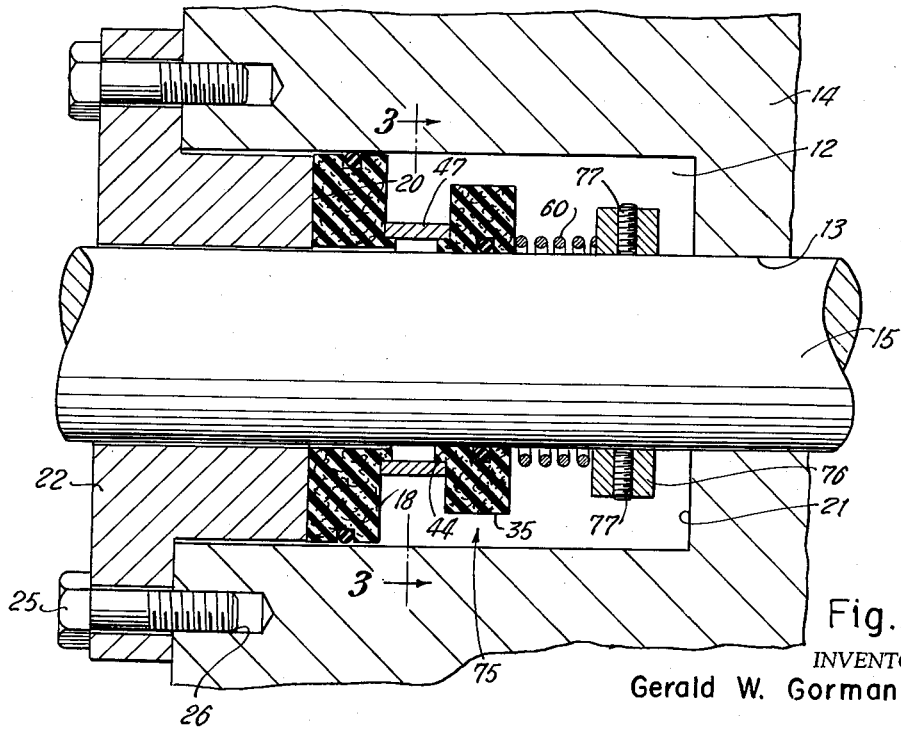
FIGURE 2 is a sectional view similar to FIGURE 1 showing a modified form of the seal assembly illustrated in FIGURE 1.

Referring now to FIGURE 2 of the drawing the sealing assembly 75 there illustrated is substantially similar to the sealing assembly 10 except that the rotatable ring 36, the stationary ring annular member 19 and the floating member 48 have been removed and a retainer ring 76 has been substituted therefor. The retainer ring 76 is rigidly secured to the rotatable shaft 15 by means of set screws 77 and the spring 60 has opposite ends which bear against the rotatable annular member 35 and the retainer ring 76. It will be apparent that the ring 76 rotates with the shaft 15 and that the spring 60 biases the rotatable annular member 35 toward the stationary annular member 18. The annular member 35 of course rotates with the shaft 15 but is longitudinally slidable thereon.

The floating ring 47 and the annular members 18 and 35 contact in the same manner as described above in connection with the sealing assembly 10 to provide a fluid tight seal between the shaft 15 and the housing 14 to prevent leakage of fluids through the shaft bore 13 outwardly of the housing 14, the ring 47 of course rotating at a much lower speed than the speed of rotation of the rotatable shaft 15.

Figure 4:
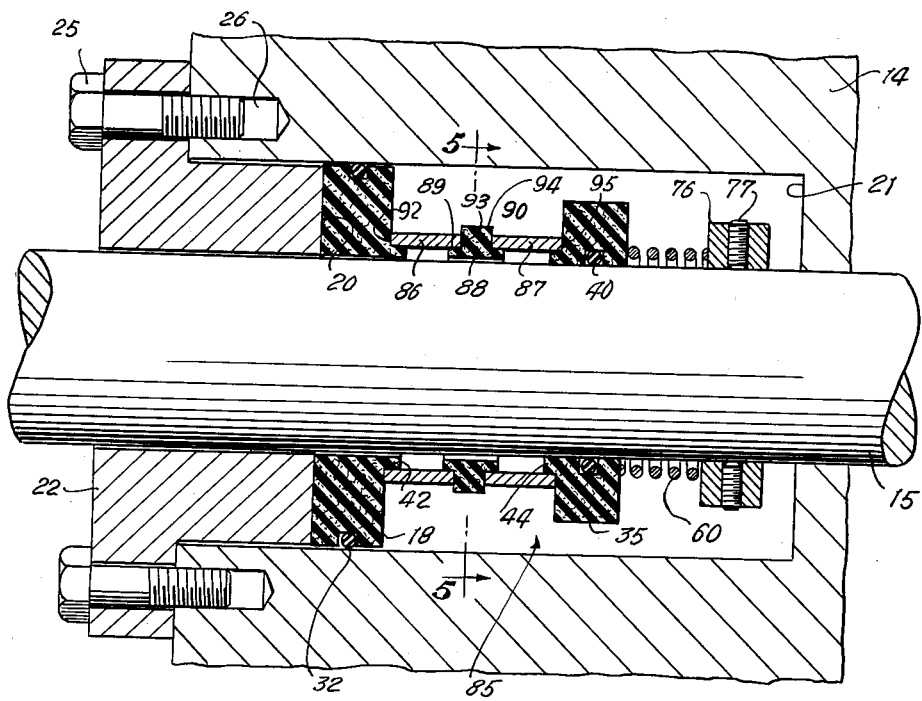
FIGURE 4 is a vertical sectional view of a housing and a rotatable shaft extending therethrough showing still another form of seal assembly embodying the invention for sealing between the housing and the shaft.
Figures 3, 5:
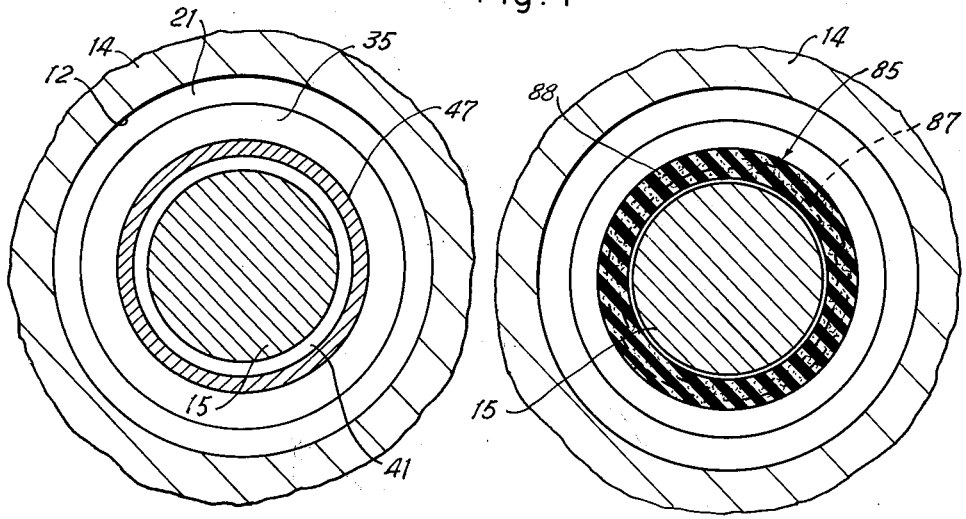
FIGURE 3 is a cross-sectional view taken on line 3—3 of FIGURE 2.
FIGURE 5 is a cross-sectional view taken on line 5—5 of FIGURE 4.

In FIGURES 4 and 5 is illustrated a seal assembly 85 which is similar in all respects to the seal assembly 75 except that the floating ring 47 is replaced by a pair of floating rings 86 and 87 which are separated by a floating annular member 88. The floating member 88 is preferably formed of the same substance as the rotatable ring 35 and is provided with end flanges 89 and 90 which telescope into adjacent ends of the floating rings 86 and 87, the outer ends of the floating rings 86 and 87 telescoping over the end flanges 42 and 44 of the annular members 18 and 35, respectively. The flat end surfaces 92 and 93 of the floating ring 86 bear against opposed flat surfaces of the stationary annular member 18 and of the floating annular member 88 to provide fluid tight seal contacts, while the flat end surfaces 94 and 95 of the floating ring 87 bear against opposed flat surfaces of the rotatable annular member 35 and of the floating annular member 88 to provide fluid tight seal contacts.

It will be apparent that the provision of two floating rings 86 and 87, together with a floating annular member disposed between them provides an additional state of rotational separation between the annular member 35 which rotates with the shaft and the stationary annular member 18 to decrease still further the relative rotational movement at the contact surfaces of the two floating rings.

It will be apparent that in the three embodiments of the invention illustrated in FIGURES 1 through 5, the rotating rings 35 and 36 rotate due to their frictional engagement with the rotatable shaft 15 on which they are telescoped and in the sealing assemblies 75 and 85 illustrated in FIGURES 2 and 4 also due to the frictional engagement with the spring 60 which bears against the retainer 76 positively locked and secured to the shaft. This frictional engagement, of course, does not preclude some rotational movement of the rotatable annular members 35 and 36, as the case may be, relative to the rotatable shaft 15, although such rotational movement will be held to a minimum and is of no material consequence in the operation of the device.

Figure 6:
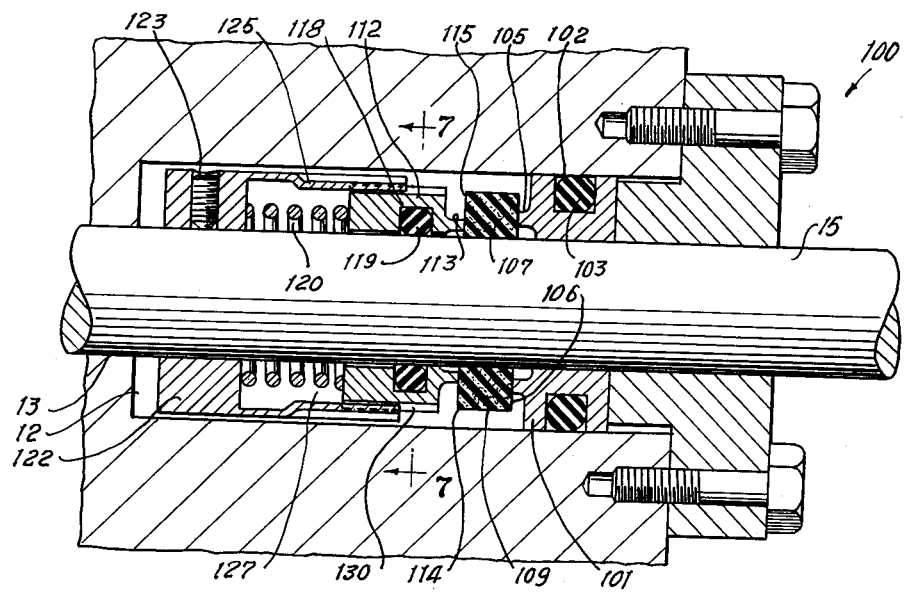
FIGURE 6 is a vertical sectional view of a shaft and its housing being still another form of the seal assembly.
Figures 7, 8:
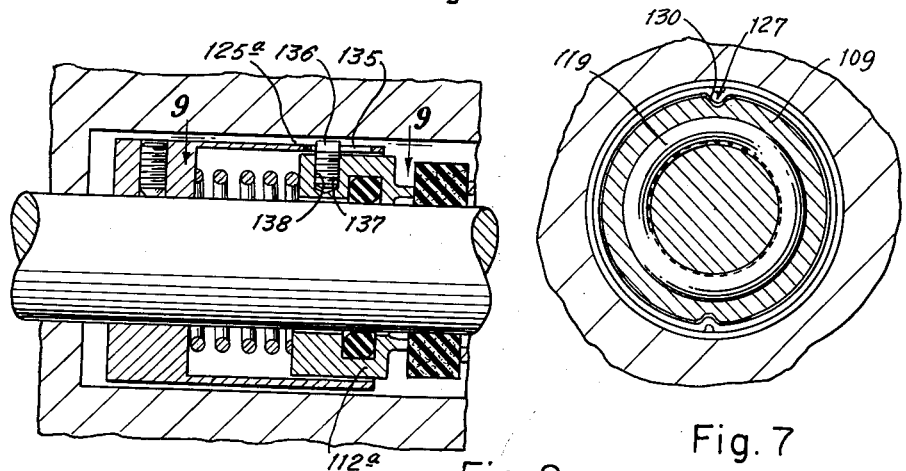
FIGURE 7 is a cross-sectional view taken on line 7—7 of FIGURE 6.
FIGURE 8 is a fragmentary cross-sectional view showing a modified form of the seal assembly for allowing longitudinal non-rotational movement of an annular member of the seal assembly on a shaft.

The sealing assembly 100 illustrated in FIGURES 6 and 7 includes a stationary annular member 101 disposed in the enlarged bore or portion or stuffing box 12 of the shaft bore 13. The stationary annular member is provided with an external annular recess 102 in which an O-ring 103 or other suitable sealing or packing means is disposed to seal between the housing 14 and the stationary annular member 101. The stationary member is provided with an annular end flange 105 whose outer end surface 107 engages the end surface 108 of a floating ring 109. The floating ring is rotatably and slidably positioned on the rotatable shaft 15.

A rotatable annular member 112 is also disposed on the shaft 15 and is provided with an annular end flange 113 whose end surface 114 bears against the end surface 115 of the floating ring 109. The rotatable member is provided with an internal recess 118 in which is disposed an O-ring 119, or any other suitable sealing or packing member, which seals between the shaft and the rotatable annular member 112. The rotatable member 112 is longitudinally slidable on the rotatable shaft 15 and is biased toward the stationary annular member 101 by a spring 120 whose opposite ends bear against the rotatable annular member 112 and a fixed annular member 122 disposed on the rotatable shaft 15 and rigidly secured thereto by set screws 123. The rigid annular member 122 is provided with a tubular extension 125 which telescopes over the rotatable annular member 112. The tubular extension 125 is provided adjacent its free end with longitudinal ribs or keys 127, which may be formed by depressing longitudinal sections of the tubular extension. The longitudinal ribs are received in longitudinal external slots 130 of the rotatable member 112. The engagement of the ribs or keys 127 of the tubular extension 125 of the rigid annular member 122 in the slots 130 of the rotatable member 112 ensures that no rotational movement of the rotatable member 112 relative to the shaft 15 will take place while at the same time longitudinal movement of the rotatable member 112 on the shaft 15 is free to take place.

The stationary member 101, the rotatable annular member 112 and the rigid annular retainer member 122 are formed of titanium, steel, brass or a similar substance, while the floating ring 109 is formed of Teflon, Gadke composition of some similar substance whereby the friction between the contacting surfaces 107 and 108 and the contacting surfaces 114 and 115 is held to a minimum.

It will now be apparent that the annular flanges 105 and 113 engage opposite ends of the floating ring 109 along small cross sectional areas thereof, thereby reducing friction therebetween to a minimum. It will further be seen that the floating ring 109 rotates at a fraction of the speed of the shaft 15, the speed of rotation of the floating ring 109 increasing when the frictional forces between the rotatable annular member 112 and the floating ring 109 increase and decrease when the frictional forces between the stationary member and the floating ring increase.

It will further be apparent that, if desired, the stationary members, such as the stationary member 101 of FIGURE 6 and the stationary members 18 and 19 of FIGURES 1 and 2 may be held stationary not only due to the frictional engagement of their peripheral surfaces with the housing but may also be provided with positive locking means, as pins or keys or a key and slot, to prevent rotation.

It will now be seen that a new and improved sealing assembly for rotatable shafts has been illustrated and described which provides for an intermediary floating means or ring between elements of the sealing assembly which are rigid with the shaft and with the housing to reduce substantially the relative rate of movement between contacting sealing surfaces which prevent flow of fluid between the shaft and the housing.

It will further be seen that the sealing assembly includes a member longitudinally slidable mounted on the shaft which is biased yieldably toward a seal member which is stationary with respect to the housing and that a floating member which is rotatable with respect both to the shaft and to the housing is interposed therebetween to provide sealing contact at its ends.

It will further be seen that the floating member rotates at a speed which is less than the speed of rotation of the shaft, thus reducing wear of the contacting seal surfaces.

It will further be seen that in one embodiment of the invention, the sealing assembly comprises two sets of floating rings each with its associated annular members, one of which is rotatable with the shaft and the other which is stationary with respect thereto and that a resilient means is disposed to bias both rotatable annular members toward their associated stationary members.

It will further be seen that in another embodiment of the invention a single stationary annular member and a single rotary annular member are separated by a single floating ring and that the rotatable annular member is longitudinally slidable toward the stationary member to maintain a certain predetermined pressure at the seal contact surfaces by a resilient member which is held on the shaft by a retainer ring.

It will further be seen that in another embodiment of the invention the floating ring is comprised of two sections which are separated by a floating annular member to further reduce the contact speed at the contacting sealing surfaces of the various seal elements.

It will also be seen that in still another modified form of the invention, the annular member which is longitudinally slidable on the shaft 15 is held against rotation on the shaft by a retaining means.

It will further be seen that the sealing assembly illustrated and described above is of simple, economical construction and may be easily assembled and disassembled for repair and installation.

Figure 9:
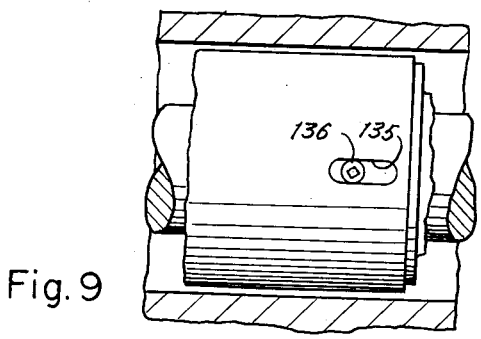
FIGURE 9 is an elevational view taken on line 9—9 of FIGURE 8.

In FIGURES 8 and 9 is illustrated another means for providing slidable movement of the rotatable member 112a on a shaft 15 while preventing rotational movement thereof. The tubular extension 125a of the annular member which is fixed to the shaft 15 telescopes over the rotatable annular member 112a and is provided with a longitudinal slot 135 in which is received the outer end 136 of a pin 137 threaded in a suitable bore 138 of the rotatable annular member 112a. It will be apparent that due to the provision of the elongated longitudinal slot 135 and the pin 137, the rotatable member 112a may slide longitudinally to a limited degree on the shaft 15 but is forced to rotate therewith due to the engagement of the pin 137 with the sides of the slot 135 of the tubular extension 125a. It will also be apparent that the annular member 122a and the rotatable annular member 112a hold the spring 120 compressed between them so that these three units may be assembled as a package or cartridge unit prior to installation on a shaft 15.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A seal assembly for a rotary shaft which extends through a bore of a housing having an enlarged recess at one end thereof providing a stop surface at one end and having a retainer means closing the opposite end of said enlarged recess including: a member in said recess stationary with the housing, said stationary member being disposed adjacent and engaging said retainer means, said stationary member having means sealing between the housing and the external periphery of said stationary member, said stationary member having a central aperture through which said shaft extends; an annular member on said shaft having sealing means preventing flow of fluids therebetween, said annular member being disposed in said recess between said stop surface and said retainer means; a floating ring disposed in said recess between said stationary member and said annular member providing sealing contact at its opposite ends with said stationary member and said annular member; and means disposed on said shaft biasing said annular member toward said stationary member, said means resiliently biasing said annular member toward said stationary member including a retaining means rigidly secured to said rotatable shaft on the side of said annular member remote from said floating ring and a spring disposed about said shaft between said retainer means and said annular means.

2. A seal assembly for a rotary shaft which extends through a bore of a housing having an enlarged recess at one end thereof providing a stop surface at one end and having a retainer means closing the opposite end of said enlarged recess including: a member stationary with the housing, said stationary member being disposed in said enlarged recess adjacent and abutting said retaining means, said stationary member having means sealing between the housing and the external periphery of said stationary member, said stationary member having a central aperture through which said shaft extends; an annular member on said shaft having sealing means for preventing flow of fluids therebetween, said annular member being disposed in said recess between said stationary member and said stop surface; a floating ring disposed between said stationary member and said annular member providing sealing contact at its opposite ends with said stationary member and said annular member; means disposed on said shaft biasing said annular member toward said stationary member, said means resiliently biasing said annular member toward said stationary member including a retaining means rigidly secured to said rotatable shaft on the side of said annular member remote from said floating ring and a spring disposed about said shaft between said retainer means and said annular means, said annular member and said retaining means having cooperable key and slot engagement preventing rotation and permitting longitudinal movement of said annular member relative to said shaft.

3. A seal assembly for a rotary shaft which extends through a bore of a housing having an enlarged recess at one end thereof providing a stop surface at one end and having a retainer means closing the opposite end of said enlarged recess including: a member stationary with the housing, said stationary member being disposed in said enlarged recess and abutting said retaining means, said stationary member having means sealing between the housing and the external periphery of said stationary member, said stationary member having a central aperture through which said shaft extends; an annular member on said shaft having sealing means preventing flow of fluids therebetween, said annular member being disposed in said recess between said stop surface and said stationary member; a floating ring disposed between said stationary member and said annular member providing sealing contact at its opposite ends with said stationary member and said annular member; means disposed on said shaft biasing said annular member toward said stationary member, said means resiliently biasing said annular member toward said stationary member including a retaining means rigidly secured to said rotatable shaft on the side of said annular member remote from said floating ring and a spring disposed about said shaft between said retainer means and said annular means, said annular member and said retainer means having coengageable means preventing rotation and permitting longitudinal movement of said annular member relative to said shaft.

4. A seal assembly for a rotary shaft which extends through a bore of a housing having an enlarged recess at one end thereof providing a stop surface at one end and having a retainer means closing the opposite end of said enlarged recess including: a member stationary with the housing, said stationary member being disposed in said recess and abutting said retaining means, said stationary member having means sealing between the housing and the external periphery of said stationary member, said stationary member having a central aperture through which said shaft extends; an annular member on said shaft having sealing means preventing flow of fluids therebetween, said annular member being disposed in said enlarged recess between said stationary member and said stop surface; a floating ring disposed between said stationary member and said annular member providing sealing contact at its opposite ends with said stationary member and said annular member; means disposed on said shaft biasing said annular member toward said stationary member, said means resiliently biasing said annular member toward said stationary member including a retaining means rigidly secured to said rotatable shaft on the side of said annular member remote from said floating ring and a spring disposed about said shaft between said retainer means and said annular means, said retaining means having a tubular extension telescoping over said annular member, said tubular extension and said annular means having cooperable key and slot engagement providing limited longitudinal non-rotational movement of said annular member relative to said shaft.

5. A seal assembly for a rotary shaft extending through a bore of a housing having an enlarged recess at one end thereof providing a stop surface at one end and having a retainer means closing the opposite end of said enlarged recess including: a member disposed in said recess and stationary with the housing, said stationary member being disposed adjacent and abutting said retainer means and having means sealing between the housing and the external periphery of said stationary member, said stationary member having a central aperture through which said shaft extends; an annular member on said shaft disposed in said recess between said stationary member and said stop surface and having sealing means for preventing flow of fluids therebetween; a floating ring in said recess disposed between said stationary member and said annular member providing sealing contact at its opposite ends with said stationary member and said annular member; and means disposed on said shaft biasing said annular member toward said stationary member.

References Cited in the file of this patent
UNITED STATES PATENTS

| | | |
|---|---|---|
| 2,148,093 | Wheeler | Feb. 21, 1939 |
| 2,328,578 | Payne | Sept. 7, 1943 |
| 2,586,739 | Summers | Feb. 19, 1952 |
| 2,712,461 | Batchelder | July 5, 1955 |
| 2,760,794 | Hartranft | Aug. 28, 1956 |
| 2,884,268 | Amirault et al. | Apr. 28, 1959 |
| 2,887,332 | Lazar | May 19, 1959 |
| 2,922,668 | Haake | Jan. 26, 1960 |